Nov. 5, 1968　　　K. G. SORENSEN　　　3,408,941
TANK FILLING CONTROL CIRCUIT
Filed April 13, 1967
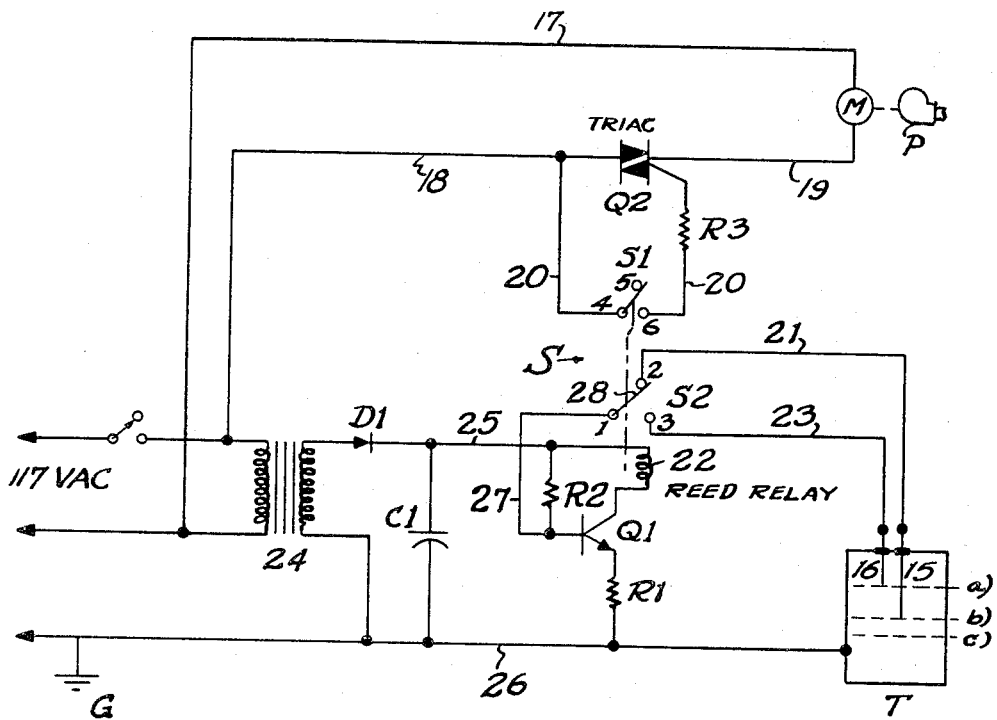
INVENTOR.
KENNETH G. SORENSEN
BY
Lynn N Latta
-ATTORNEY- United States Patent Office 3,408,941
Patented Nov. 5, 1968

3,408,941
TANK FILLING CONTROL CIRCUIT
Kenneth G. Sorensen, 12118 Ohio,
Los Angeles, Calif. 90025
Filed Apr. 13, 1967, Ser. No. 630,736
7 Claims. (Cl. 103—25)

ABSTRACT OF THE DISCLOSURE

Disclosed herein is an electronic control circuit including a liquid level responsive transistorized pilot circuit controlling a sensitive reed relay with a current of only a few milliammeters, which in turn controls a triac switching unit for supplying current to a pump on demand in response to low liquid level in a tank, and for turning off the pump when the tank is refilled by operation of the pump.

Background of invention

Liquid level detection circuits utilizing bias-controlled electronic components such as vacuum tubes, transistors, solid-state rectifiers, etc., for detecting liquid level limits at small current values to excite much heavier current-carrying circuits for operating indicators or functional units such as valves, pumps, etc., have heretofore been utilized and have been disclosed, insofar as I am aware, in the following prior patents: T. L. La Pointe, 3,206,615; Kenneth G. Sorensen, 3,252,420.

Summary of invention

The unit control circuit of the invention is particularly characterized by the use of a liquid-level sensing unit embodying a single-transistor circuit, excited by a very low amperage signal in the form of a pulsing direct current, in response to a change in liquid level in a tank, to develop a low amperage transistor output current which is utilized to energize a sensitive reed relay, and by the use of a pair of silicon-controlled rectifiers in a triac combination, as a switching unit which is bias-controlled by the reed relay so as to transmit an alternating current of such wattage and full-wave character (e.g., ordinary 117-volt commercial current) as to operate a conventional induction motor for driving a pump or other common electric appliance. A step-down transformer and a half-wave rectifier are utilized for taking off a small increment of the alternating current supply to provide a power supply for the sensing unit.

The object of the invention is to provide a simple, compact, inexpensive control unit energized by ordinary 110–117 volt household or commercial alternating current, for very low current sensing of high and low liquid levels, and operating pumps, valves, etc., which are powered by motors, solenoids, or the like energized by such ordinary alternating current, to control restoration of liquid level from low to high limit.

These and other objects of the invention will become apparent in the following specifications and appended drawing, which is a schematic diagram of the control circuit of the invention.

Description

Referring now to the drawing in detail, and in particular to the circuit shown therein, it represents an example of a unit control circuit in which the invention may be embodied. The circuit is particularly adapted for controlling the liquid level in a tank T, e.g., by controlling the operation of a pump P for pumping liquid into the tank when the liquid level therein drops below the lower end of an electrode 15, and continuing the pumping until the rising liquid (a conductive liquid) contacts an electrode 16.

The invention utilizes electric power from a common source such as a conventional commercial power circuit, indicated at 117 v. A.C., supplying alternating current at about 117 volts, such current being fed directly to a conventional electric (e.g., induction) motor which drives the pump. The motor supply circuit includes a conductor 17 on one side, and series conductors 18 and 19 on the other side, connected by a full-wave switching unit Q2 of a bias-controlled type known as a triac, comprising two silicon-controlled rectifier diodes connected for conduction in opposite directions, each diode conducting a respective half wave. Triac Q2 is bias-controlled by a bias circuit including a biasing resistor R3 and an on-off, normally open relay switch S1 shunted across the triac by conductors 20 when the switch is closed from its point 4 to its contact 6.

Switch S1 is a part of a reed relay S including a second switch S2. Switch S2 is a double-throw switch which is normally closed at its contact 2, connected by a conductor 21 to tank electrode 15, and is normally open from its point 1 to its contact 3, connected by a conductor 23 to tank electrode 16. Relay S has an actuator coil 22 which, when energized, effects reversal of switch S2 so as to close circuit 23.

Relay S is quite sensitive, having an armature reed 28 of thin, highly flexible spring strip metal, and operable on a 10 milliampere 12-volt direct current supplied to it as the collector current output of a transistor Q1, in a circuit including the collector and emitter of Q1, a resistor R1, conductors 25, 26 and a power supply D1, C1. The 12-volt current is drawn from power supply unit D1, C1 comprising the secondary of a step-down transformer 24, a pair of conductor leads 25, 26 extending from respective ends of such secondary, a diode D1 in lead 25, for uni-directional transmission, and a capacitor C1 connected across the leads 25, 26 between the diode and relay S. Conductor 25 is connected to one end of relay coil 22 and to a resistor R2 for supplying biasing voltage to the base of transistor Q1. Transistor Q1 is biased to a conductive condition when either of two sensing circuits is closed. Two alternate sensing circuits for biasing transistor Q1 are provided respectively by tank electrodes 15, 16, their conductor leads 21, 23, relay switch S2 in its respective positions, a conductor connecting the reed 28 of switch S2 to the base of transistor Q2, resistor R1, an extension of power supply lead 26 to the metal wall of tank T, and the body of liquid L in the tank. Switch S1 embodies a separate contact carried by reed 28 and adapted to bridge the two contacts of switch S1 when switch S2 is closed on its circuit 21. Conductor 26 is a ground conductor, as indicated at G.

In the operation of the control circuit, when tank T is filled to level a, the relay S will be de-energized and in the position shown, since the base of transistor Q1 will be connected to ground through points 1 and 2 of relay switch S2, thence through electrode 15 and the conductive liquid in the tank, to ground connection 26. The base of transistor Q1 being thus grounded, it is reverse-biased to non-conductive condition (turned off).

When the liquid level falls to level b, transistor Q1 will remain off, its base still being grounded through electrode 15.

When the liquid level falls to level c, transistor Q1 will be turned on since its base is no longer connected to ground, the sensing circuit being opened at the lower end of electrode 15. Biasing resistor R2 will forward-bias the base of transistor Q1, rendering it conductive, which in turn will energize coil 22 of the reed relay, causing the relay to reverse, each of the switches S1, S2 shifting to their alternate positions connecting relay point 1 to 3 and point 4 to 6 (closing switch S1). The closing of switch S1 completes the biasing circuit 20, R3 of triac Q2, thus biasing the triac to conductive condition. Thus the power circuit 17, 18 is established through triac Q2 to motor M which drives pump P, thus starting to fill the tank.

As the level rises in the tank, point *b* is reached but nothing happens because relay point 1 is connected to point 3 and the relay is open at contact 2. The level therefor continues to rise until level *a* is reached.

At level *a* the transistor Q1 is turned off since its base is connected to ground, thus reverse biasing it, through electrode 16, point 3, point 1, the grounded tank and the conductive liquid.

Therefore when the level in the tank falls below rod electrode 15, the pump motor turns on, and will remain on until the level of the tank reaches electrode 16. Electrode 16 turns it off and electrode 15 turns it on.

I claim:
1. In a tank-filling system including a tank and an electric motor utilizing current from a conventional alternating current source for driving a tank-filling pump, the improvement which comprises, in combination:
   a low voltage direct current supply including the secondary of a step down transformer having a primary connectible to said alternating current source, and unidirectional current-flow means and a capacitor for converting the output of said secondary into direct current;
   power leads connectible to said source and to said motor, one of said leads comprising separate sections;
   a triac switching unit interposed between the sections of said one lead, for completing a power circuit to said motor when biased to conductive state;
   a biasing circuit shunted across said triac;
   a two-pole sensitive reed relay including a first switch in said biasing circuit for closing and opening the same and a second double-throw switch having alternate contacts and a movable contact closeable on either of said alternate contacts;
   a pair of sensing circuit including high and low electrodes in said tank and conductor connections between the respective electrodes and the respective alternate contacts of said second switch;
   a relay transistor;
   an energizing circuit for said relay including the conductive circuit of said transistor and connection therefrom to said relay and to said direct current source; and
   a biasing circuit for said transistor comprising a connection between said transistor and said direct current supply and a connection between said transistor and said movable switch contact, for selective grounding connections to the liquid in said tank through the respective electrodes in the respective alternate positions of the relay.

2. The system defined in claim 1, wherein said triac is biased to conductive condition and sensing circuit connection to the high electrode is established when the relay is energized.

3. The system defined in claim 2, wherein said transistor is base-biased and is rendered non-conductive by grounding its base through either of said electrodes.

4. The system defined in claim 3, wherein the sensing circuit to said low electrode is opened when said triac is rendered conductive, and remains open until rising liquid in said tank contacts said high electrode to ground said transistor base and thereby deenergizes said relay so as to render said triac non-conductive, thereby shutting down the tank-filling operation.

5. The system defined in claim 1, wherein said bias resistor is shunted across the energizing coil of said relay.

6. The system defined in claim 1, the biasing circuit for said transistor comprising a bias resistor connected between said transistor and said direct current supply.

7. The system defined in claim 1, said triac biasing circuit including a bias resistor biasing circuit including a bias resistor in series with said first switch.

References Cited

UNITED STATES PATENTS

| | | |
|---|---|---|
| 3,118,391 | 1/1964 | Ciabattari et al. |
| 3,351,084 | 11/1967 | Halkiades. |
| 3,352,246 | 11/1967 | Inove. |
| 3,362,334 | 1/1968 | Ramsay. |

WILLIAM L. FREEH, *Primary Examiner.*